United States Patent
Saito

(10) Patent No.: US 7,113,363 B2
(45) Date of Patent: Sep. 26, 2006

(54) SEEK ERROR RETRY METHOD OF A DISK DEVICE AND DISK DEVICE

(75) Inventor: Tomoaki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/182,104

(22) Filed: Jul. 15, 2005

(65) Prior Publication Data

US 2006/0171061 A1 Aug. 3, 2006

(30) Foreign Application Priority Data

Jan. 31, 2005 (JP) .............................. 2005-023548

(51) Int. Cl.
 G11B 5/596 (2006.01)
 G11B 21/02 (2006.01)
(52) U.S. Cl. ............................... 360/78.04; 360/78.08; 360/75
(58) Field of Classification Search .................... None
See application file for complete search history.

(56) References Cited

U.S. PATENT DOCUMENTS 6,108,157 A * 8/2000 Yoneda et al. ................ 360/75

2003/0043496 A1 * 3/2003 Kawana et al. ............... 360/75

FOREIGN PATENT DOCUMENTS

JP 2001-093104 4/2001

* cited by examiner

Primary Examiner—Andrew L. Sniezek
(74) Attorney, Agent, or Firm—Greer, Burns & Crain, Ltd

(57) ABSTRACT

In a disk device having a ramp-load mechanism, stable retry operation is performed even upon occurrence of seek errors. A disk device is provided with a ramp to which the head is retracted from the disk, at the time of seek error retry, prior to beginning seek retry, checks whether the head has climbed onto the ramp. And if the head has not climbed onto the ramp, normal seek retry is performed, but if the head has climbed onto the ramp, unloading is first performed before seek retry. Consequently crashes due to climbing onto the ramp due to a seek error in a ramp-load device can be prevented, and improvement of device reliability can be expected.

20 Claims, 7 Drawing Sheets

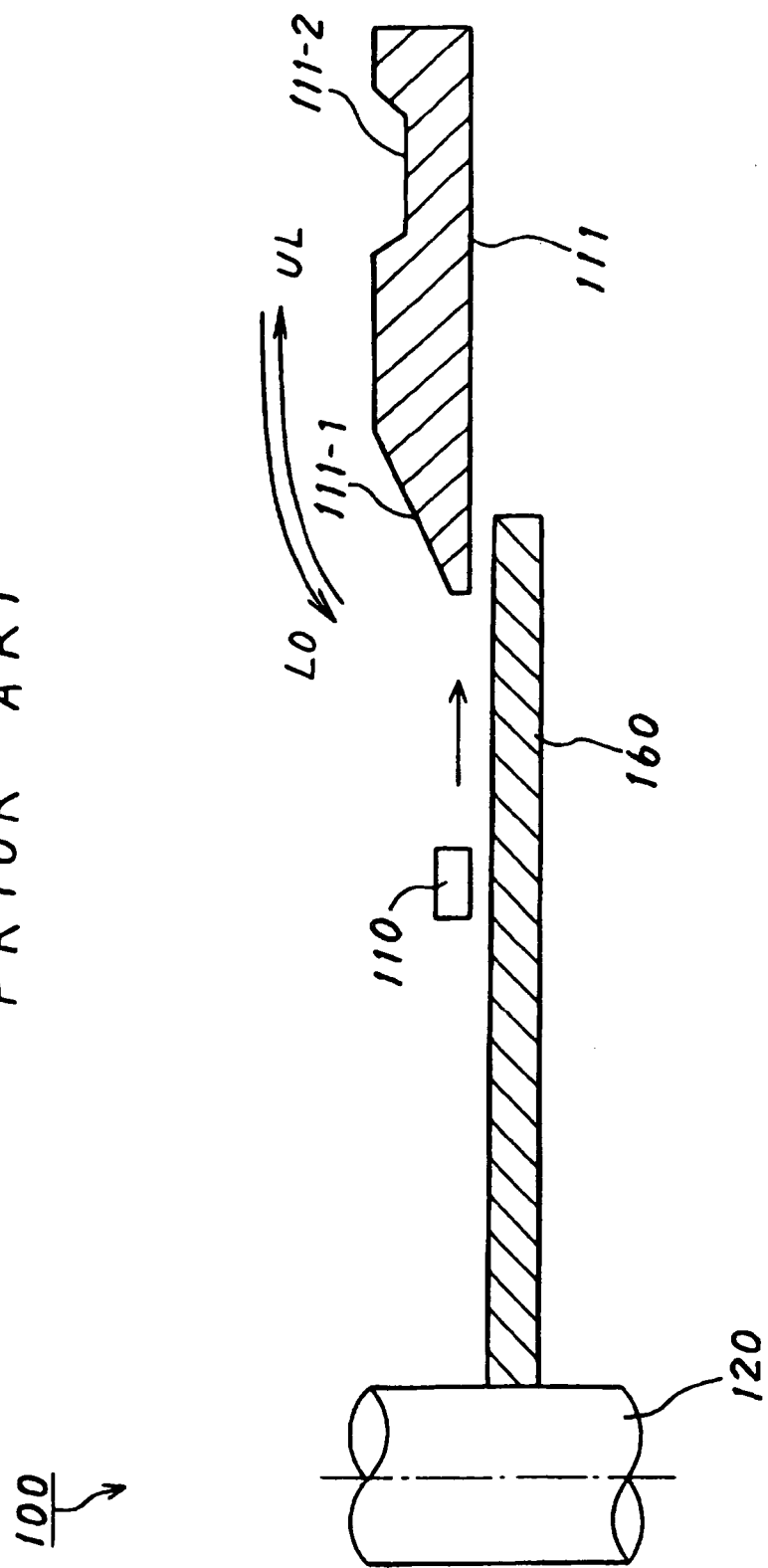

SEEK ERROR RETRY METHOD OF A DISK DEVICE AND DISK DEVICE

CROSS-REFERENCE TO RELATED APPLICATIONS

This application is based upon and claims the benefit of priority from the prior Japanese Patent Application No. 2005-023548, filed on Jan. 31, 2005, the entire contents of which are incorporated herein by reference.

BACKGROUND OF THE INVENTION

1. Field of the Invention

This invention relates to a seek error retry method of disk device and its disk device to perform retry control when a seek error has occurred during head seeking, and in particular relates to a seek error retry method of disk device and its disk device, which is suitable for a disk device having a ramp mechanism to retract a head from the disk media.

2. Description of the Related Art

A disk device employing a magnetic disk, magneto-optical disk, optical disk, or other storage media performs a seek operation to position the head at a desired track on the disk. In such a disk device, as the head flying height is reduced, use of the CSS (Contact Start-Stop) method becomes difficult. Moreover, there are demands for disk devices with improved resistance to shocks when not in operation.

Consequently devices adopting a ramp-load method have been proposed. In a ramp-load method, a ramp mechanism is provided on the external perimeter of the disk, and while not in operation the head is retracted from the disk to the ramp mechanism. FIG. 9 shows the configuration of a magnetic disk device adopting a conventional ramp-load method.

As shown in FIG. 9, a magnetic disk 160 is provided on the spindle 120 of the magnetic disk device. The magnetic head 110 which reads information on the magnetic disk 160 moves in the radial direction of the magnetic disk 160. A ramp mechanism 111 is provided at the outermost perimeter of the magnetic disk 160. The ramp mechanism 111 has an inclined portion 111-1 and a depressed portion 111-2.

In a ramp-load method, when operation ends the magnetic head 110 is moved to the ramp mechanism 111, as indicated by the direction of the arrow UL. The magnetic head 110 rides over the inclined portion 111-1 of the ramp mechanism 111, and is accommodated in the depressed portion 111-2 (this is called an unload operation). On the other hand, when starting operation the magnetic head 110 is moved from the ramp mechanism 111 to the magnetic disk 160, as indicated by the direction of the arrow LO. The magnetic head 110 moves from the depressed portion 111-2 to the inclined portion 111-1 of the ramp mechanism 111 to return to the magnetic disk 160 (this is called a load operation). At the time of this load operation, for example the velocity is detected based on the back-electromotive force of the VCM (actuator) driving the magnetic head 110, and the velocity is controlled at a prescribed velocity to load the magnetic head 110 and prevent crashes.

In the prior art, when seeking in the outward direction, if a seek error occurs the magnetic head 110 is immediately stopped, and a current flows in the inward direction (current in the opposite direction), causing motion in the inward direction, to perform a seek error retry (see for example Japanese Patent Laid-open No. 2004-178790).

In recent years, the densities of magnetic disks 160 have risen and the area up to the outermost perimeter have been used as a data zone, in order to increase storage capacities; and in order not to detract from performance as capacities are increased, there has been a demand for faster seek velocities. For example, in sampled servo operation during seeking, the head moves over 200 to 300 tracks for one sample.

Hence in the prior art, when there is a degree of velocity outward during seek error detection, and when seek error detection is delayed, there is the danger that the head 110 may ride over the ramp mechanism 111. If current in the inward direction is begun in this state, due to high-speed loading action the head 110 may collide with the magnetic disk 160, causing a crash between the magnetic head 110 and magnetic disk 160.

In particular, when the disk storage density is high and the data zone is extended outward for increased storage capacity, if a seek error occurs during outward-direction seeking, the head may readily climb onto the ramp mechanism.

SUMMARY OF THE INVENTION

Hence an object of this invention is to provide a seek error retry method of a disk device and its disk device having a ramp-load mechanism, to safely execute seek error retries.

A further object of this invention is to provide a disk device seek error retry method of a disk device and a disk device to prevent crashes between head and disk during seek error retries.

Still a further object of this invention is to provide a seek error retry method of a disk device and a disk device to prevent crashes between head and disk during seek error retries, without increasing the retry time.

Still a further object of this invention is to provide a seek error retry method of a disk device and a disk device to safely execute seek error retries, and to realize fast operation and large storage capacities.

In order to achieve these objects, a seek error retry method of this invention has a step of judging whether the head has climbed onto the ramp provided to retract the head, in response to seek error detection; a step, when the judgment indicates that the head has not climbed onto the ramp, of again seeking the head to the desired track; a step, when the judgment indicates that the head has climbed onto the ramp, of unloading the head from the ramp and then loading the head from the ramp onto the disk; and a step, after this loading, of again seeking the head to the desired track.

A disk device of this invention has a head which at least reads information on a disk, an actuator which seeks a desired track position on the disk, a control unit which controls the actuator according to output from the head, detects seek errors, and performs retry processing, and a ramp provided to retract the head from the disk. And the control unit judges whether the head has climbed onto the ramp, in response to seek error detection, and if according to the judgment the head has not climbed onto the ramp, again seeks the head to the desired track, but if according to the judgment the head has climbed onto the ramp, after unloading the head from the ramp, loads the head from the ramp onto the disk, and after this loading, again seeks the head to the desired track.

Further, it is preferable that in this invention, the judgment step comprise a step of judging, from the head output, whether the head has climbed onto the ramp.

Further, it is preferable that in this invention, the judgment step comprise a step of judging, from the gain of the AGC circuit performing AGC control of the output of the head, whether the head has climbed onto the ramp.

Further, it is preferable that in this invention, the again seek step further have a step of detecting whether a seek error has occurred, and, when a seek error is detected, a step of again executing the above judgment step.

Further, it is preferable that in this invention, the load step comprise a step of performing velocity control of the head movement to load the head onto the disk.

Further, it is preferable that this invention further have a step of limiting the number of executions of the above repeated execution step.

Further, it is preferable that in this invention, the judgment step comprise a step of judging whether the head has climbed onto the ramp, in response to a seek error due to detection of the absence in the head output of servo information written to the disk.

Further, it is preferable that in this invention, the judgment step comprise a step of judging, from the output of the magnetic head which is the above head which reads servo information written to the magnetic disk which is the above disk, whether the head has climbed onto the ramp.

Further, it is preferable that in this invention, the load step comprise a step of executing unload processing to retract the head to the ramp and load processing.

Prior to beginning seek retry at the time of a seek error retry, a check is performed to determine whether the head has climbed onto the ramp, and if the head has not climbed onto the ramp a normal seek retry is performed, but if the head has climbed onto the ramp, load and unload process is performed again form the unloading before the seek retry. Consequently crashes caused by ramp-climbing due to seek errors in a device adopting the ramp-load method can be prevented, and improved device reliability can be expected. Moreover, unloading and loading are not performed each time during seek errors, so that the retry time can be shortened, and ramp wear and similar can also be prevented. Further, the normal unload/load functions of a device adopting the ramp-load method are used, so that the invention can be realized without adding special functions.

DESCRIPTION OF THE PREFERRED EMBODIMENTS

Below, embodiments of the invention are explained, in the order of a disk device, seek error retry processing, and other embodiments.

Disk Device

Figure 1:
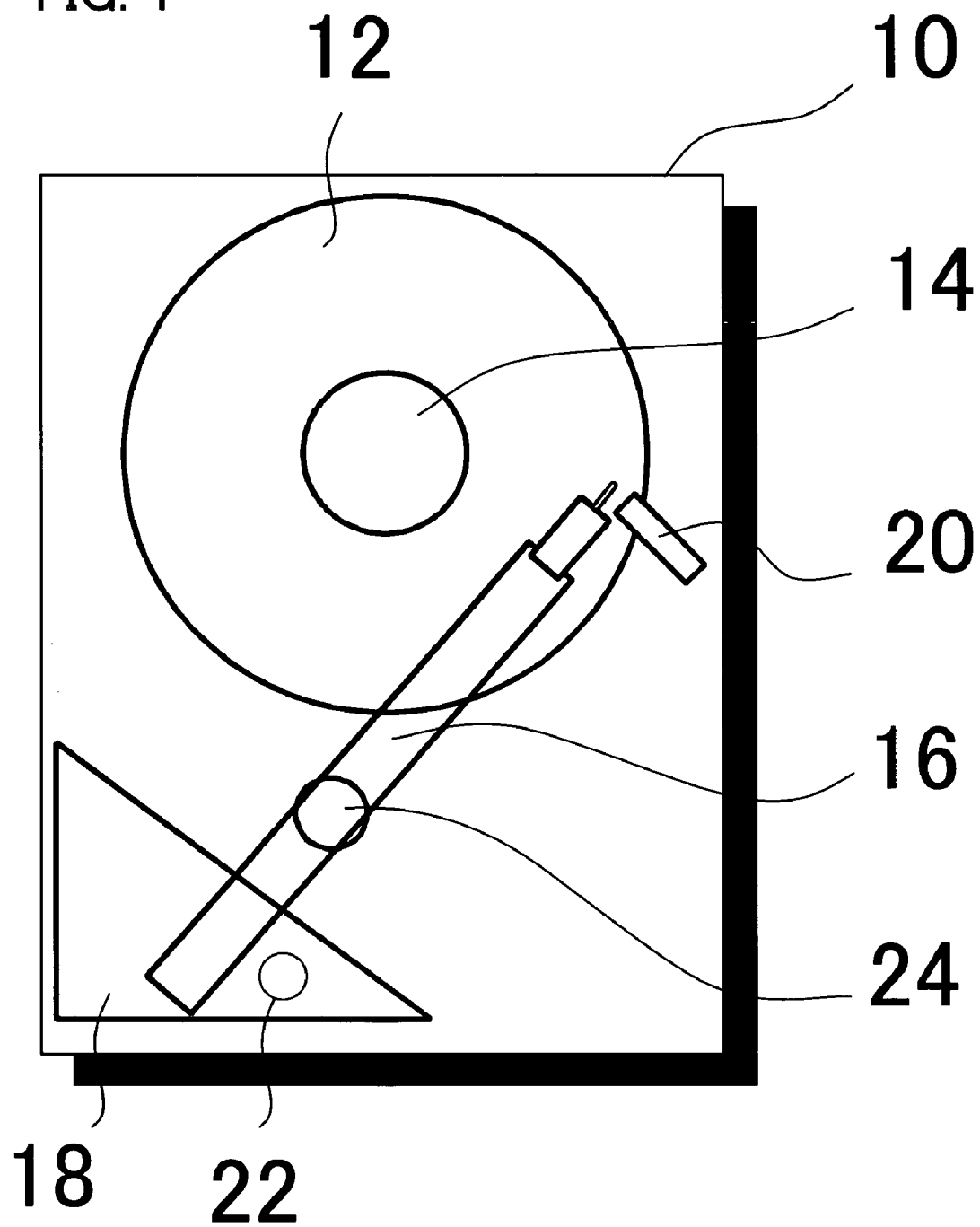
FIG. 1 shows the configuration of the magnetic disk device of a first embodiment of the invention.
Figure 2:
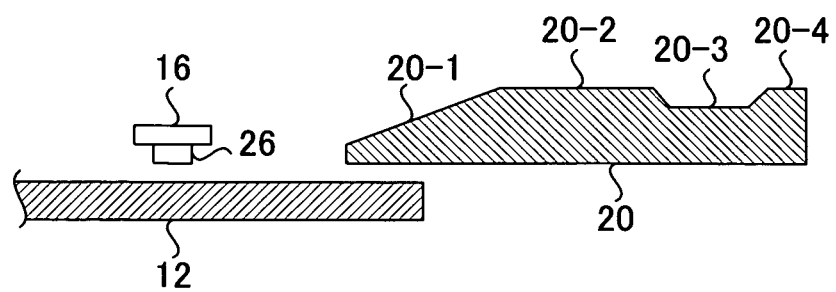
FIG. 2 is a cross-sectional view of the ramp mechanism of FIG. 1.
Figure 3:
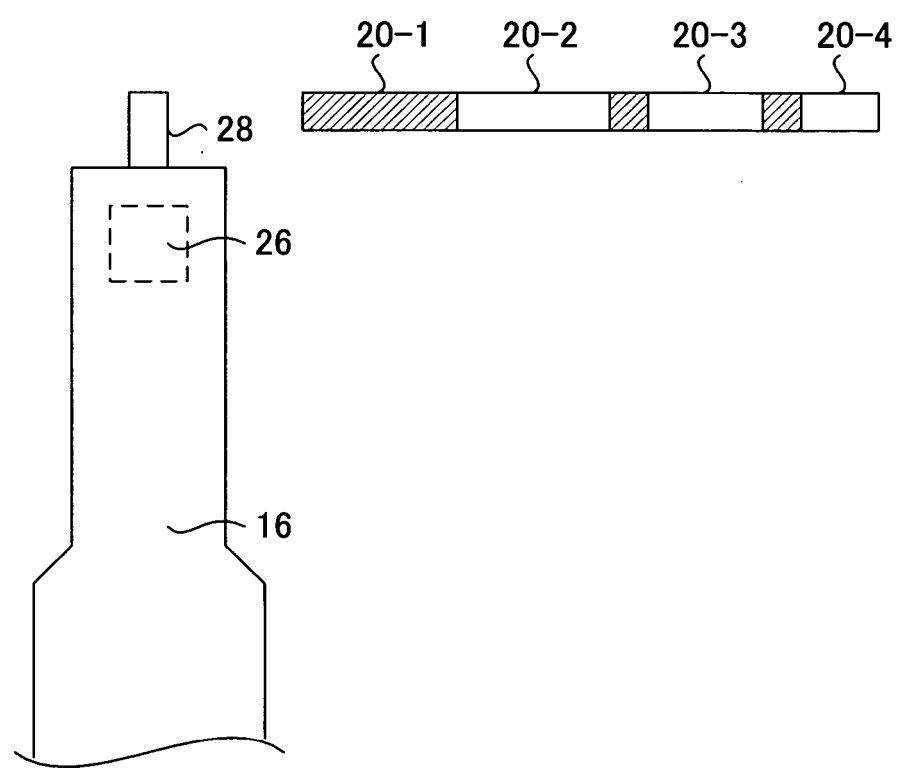
FIG. 3 is a top view of the ramp mechanism of FIG. 1.
Figure 4:
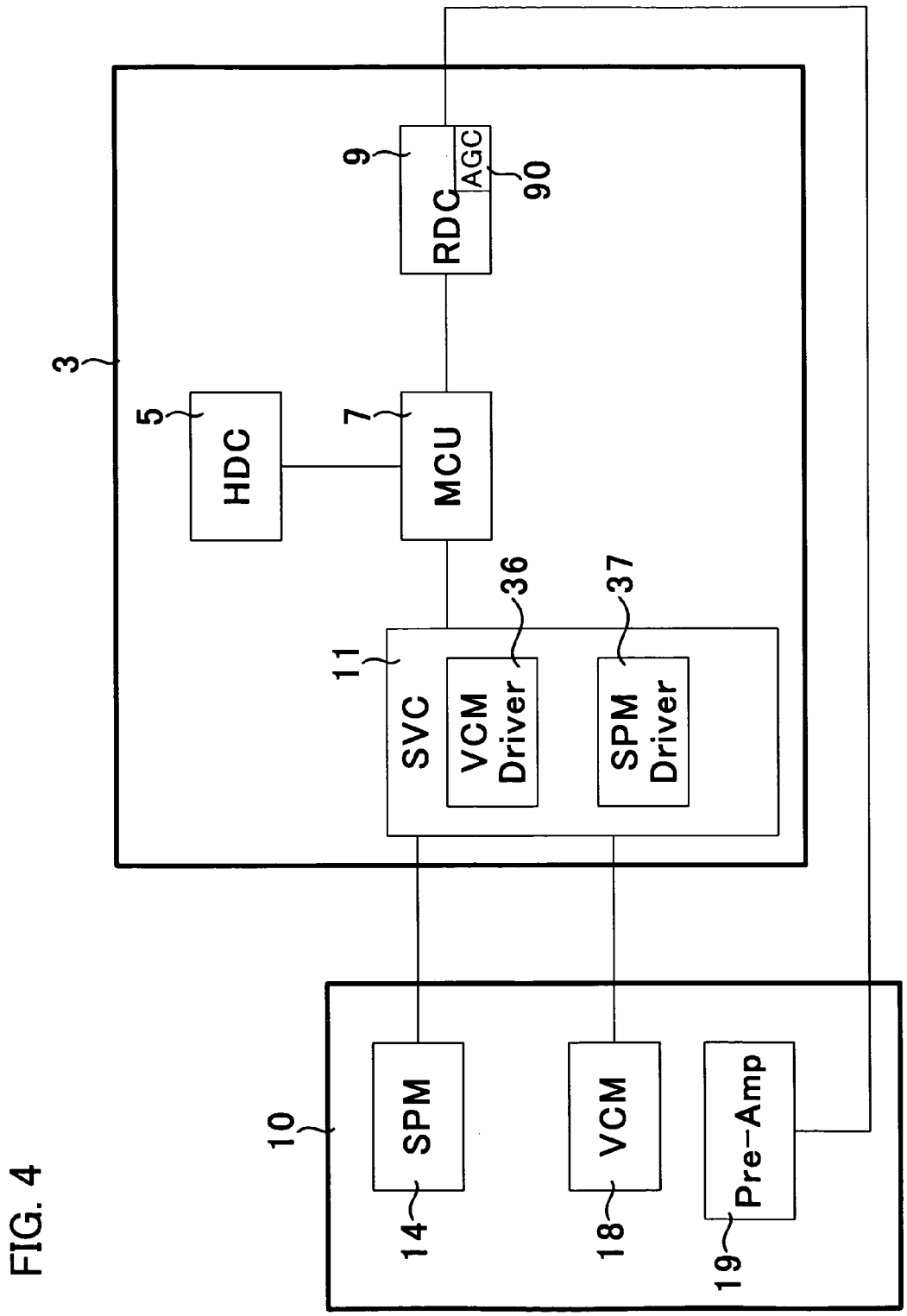
FIG. 4 is a block diagram of the control unit in the magnetic disk device of FIG. 1.

FIG. 1 shows the configuration of the magnetic disk device of a first embodiment of the invention, FIG. 2 is a cross-sectional view of the ramp mechanism of FIG. 1, FIG. 3 is a top view of the ramp mechanism of FIG. 1, and FIG. 4 is a block diagram of the control unit in the magnetic disk device of FIG. 1. As the disk device, the example of a magnetic disk device is shown.

As shown in FIG. 1, the magnetic disk drive 10 has a magnetic disk 12; a spindle motor 14 which rotates the magnetic disk 12; an arm 16 having at the tip a head slider comprising a magnetic head 26; a VCM (Voice Coil Motor) 18 which moves the arm 16, comprising the head slider, in the radial direction of the magnetic disk 12; and a ramp 20, provided on the outer perimeter of the magnetic disk 12, to which the arm 16 is retracted.

The VCM 18 comprises a fixed magnet and a driving coil provided at the posterior end of the arm 16. The arm 16 comprises a swing arm which rotates about a rotation axis 24. The VCM 18 is provided with an inner stopper 22, which limits the inner-perimeter position of the arm 16.

The arm 16 and ramp 20 are explained using FIG. 2 and FIG. 3. The ramp 20 comprises an inclined surface 20-1, which rises at an incline from the side of the magnetic disk 12; a first level surface 20-2 which continues from the inclined surface; and a groove portion 20-3, continuing from the first level surface 20-2, provided between the first level surface 20-2 and a second level surface 20-4.

On the other hand, a lift 28 (see FIG. 3) is provided at the tip of the arm 16, and a head slider 26 comprising a magnetic head is provided at the top of the arm 16. The magnetic head may be called as sign '26' below. A head unload (retraction) operation is an operation in which, by moving the arm 16 rightward in FIG. 2 and FIG. 3, the lift 28 of the arm 16 climbs over the inclined surface 20-1 of the ramp 20, past the first level surface 20-2 to reach the groove portion 20-3, and is stopped by the step portion with the second level surface 20-4. By this means the lift 28 falls precisely into the groove portion 20-3 and is parked.

Conversely, a head load operation is an operation in which the arm 16, parked in the groove portion 20-3, is moved leftward in FIG. 2 and FIG. 3, so that the lift 28 climbs over the inclined surface of the groove portion 20-3 and the first level surface 20-2, and slides down the inclined surface 20-1, so that the arm 16 comprising the head is returned to above the magnetic disk 12.

This load and unload operation is performed by driving the VCM 18. As is well known, during this load operation, the velocity is detected from the back-electromotive force of the VCM (actuator) 18 driving the arm 16 comprising the magnetic head, and the VCM 18 is velocity-controlled so that the magnetic head is loaded onto the magnetic disk 12 at a prescribed velocity, to prevent crashes.

FIG. 4 is a block diagram of the control circuit 3 of the disk drive in FIG. 1, and in particular shows IC chip units. The HDC (hard disk controller) chip 5 controls the interface with the host CPU (not shown), including exchange of data and various commands with the host CPU, and generates control signals within the magnetic disk drive to control the recording and reproduction format on the magnetic disk 12.

The MCU (microcontroller) chip 7 comprises a microprocessor (MPU) and similar. The MCU 7 executes servo control to position the magnetic head 26. The MCU 7 executes a program stored in memory, not shown, recognizes head position signals (servo information recognition and demodulation), and performs computation of control current values for the VCM 18 and SPM 14 of the SVC (Servo Combo Driver) 11, by means of servo control operations.

Further, the MCU 7 performs seek control processing and seek error retry processing, described below. The SVC chip 11 is a driving circuit for the spindle motor (SPM) 14 and VCM 18 of FIG. 1, and has a VCM driver 36 and spindle driver 37.

The read channel chip 9 is a circuit to perform recording and reproduction. The read channel 9 has an AGC circuit 90 comprising a peak hold circuit and an integrated circuit as a circuit for demodulating servo patterns recorded on the magnetic disk 12, a modulation circuit to record write data from the host CPU onto the magnetic disk 12, and a demodulation circuit to reproduce data from the magnetic disk 12.

The preamp 19, installed on the arm 16, amplifies the reproduced voltage from the magnetic head 26 and outputs the result to the read channel chip 9.

By means of this configuration, the AGC (Automatic Gain Control) circuit 90 of the read channel chip 9 controls the reproduced voltage gain according to the reproduced voltage, so that the magnetic head reproduced voltage from the preamp 19 is held at a prescribed voltage.

Seek Error Retry Processing

Figure 5:
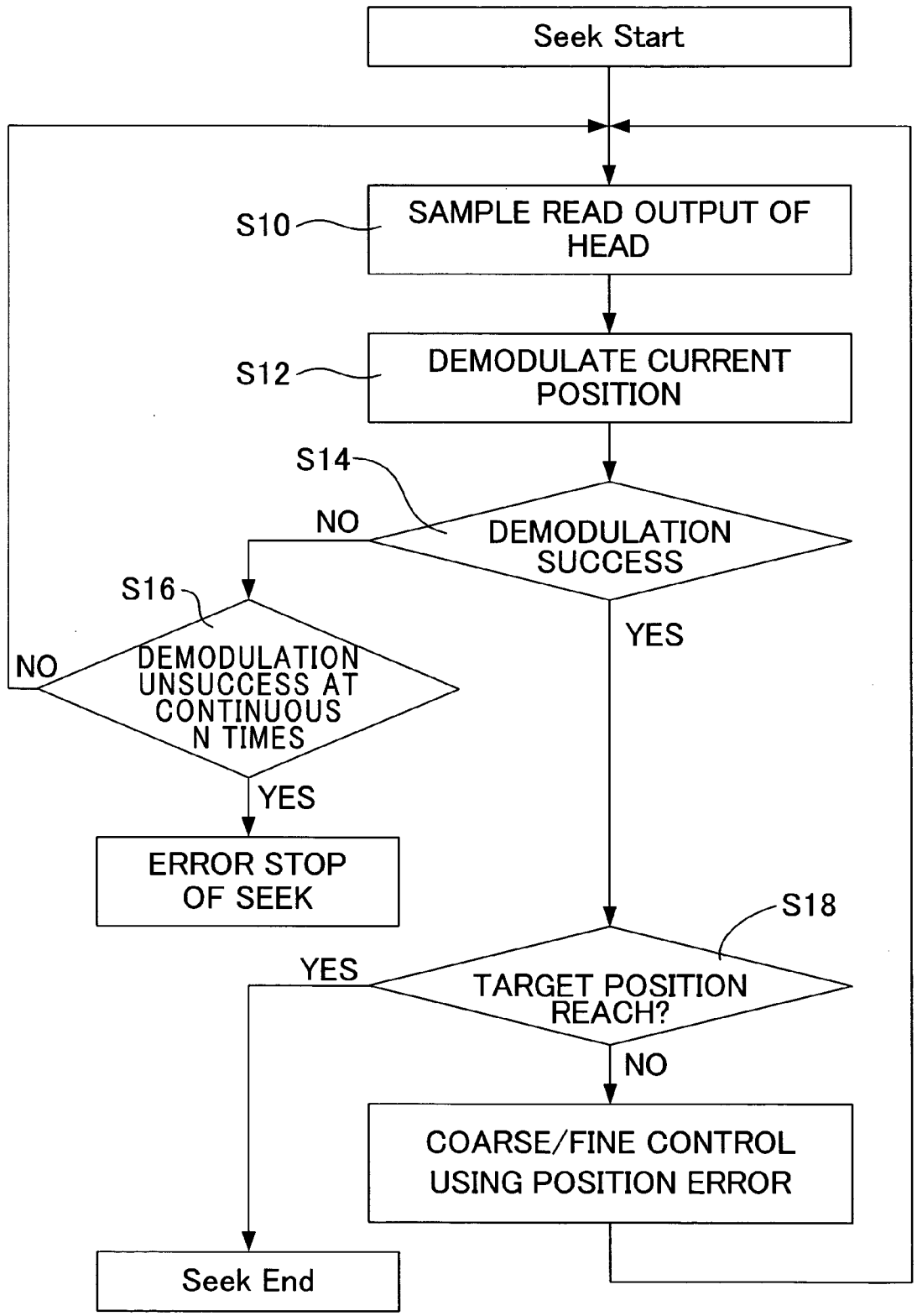
FIG. 5 is a diagram of seek processing flow in the first embodiment of the invention.
Figure 6:
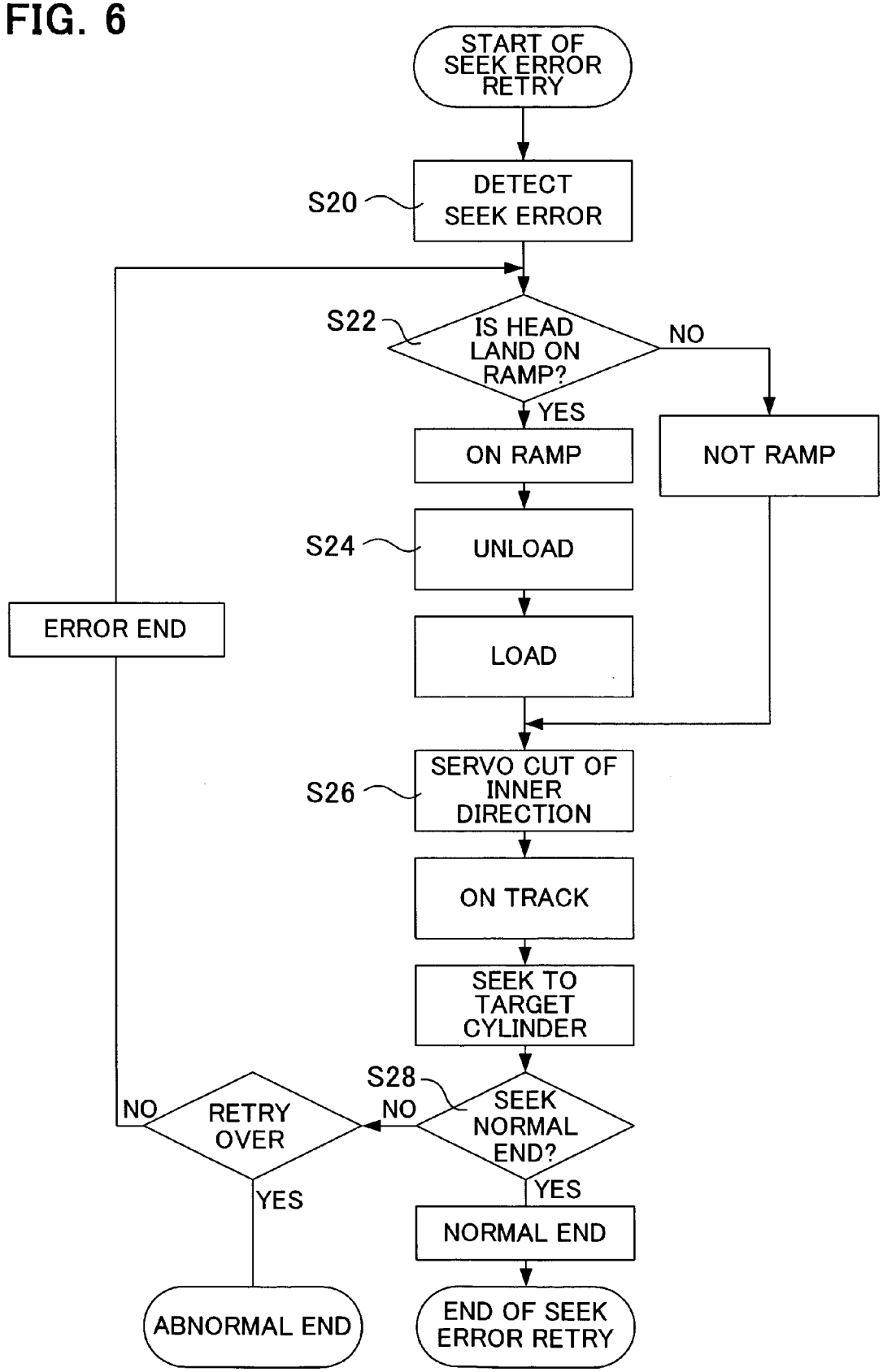
FIG. 6 is a diagram of seek error retry processing flow in the first embodiment of the invention.
Figure 7:
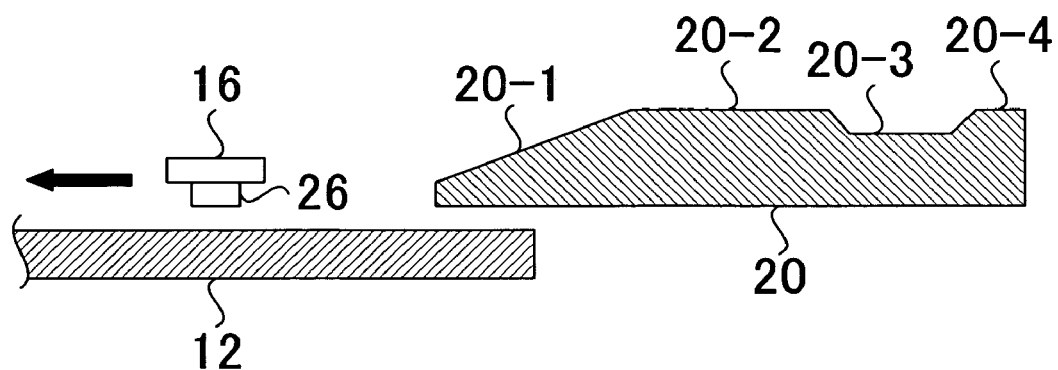
FIG. 7 explains retry operation when the head has not climbed onto the ramp in FIG. 6.
Figure 8:
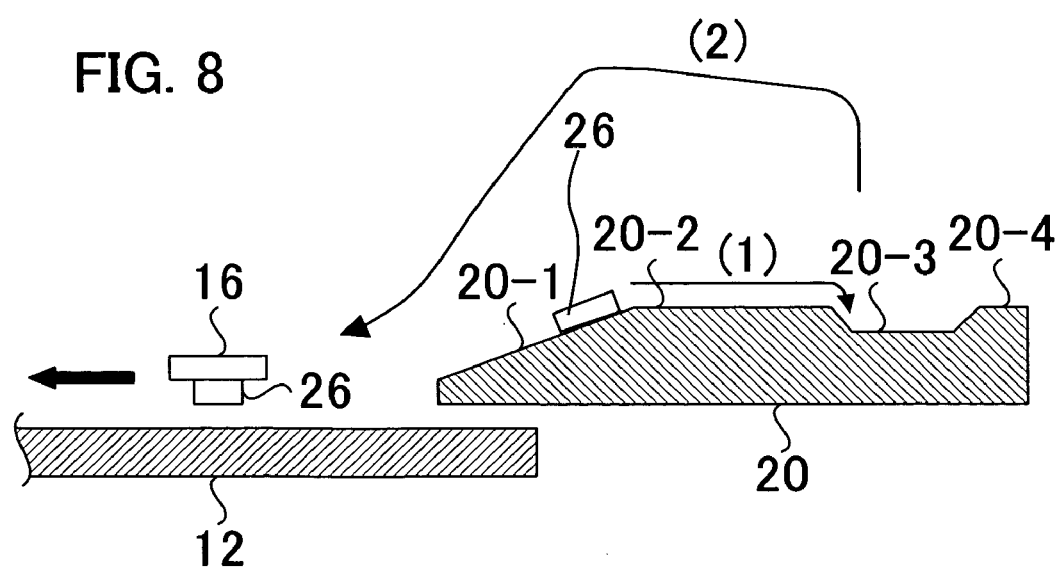
FIG. 8 explains retry operation when the head has climbed onto the ramp in FIG. 6; and, FIG. 9 explains the technology of the prior art.

FIG. 5 is a diagram of the flow of seek processing in the first embodiment of the invention, FIG. 6 is a diagram of the flow of seek error retry processing, and FIG. 7 and FIG. 8 explain seek error retry operation. First, seek processing is explained using FIG. 5.

(S10) Upon initiating seek, a coarse control velocity curve is formed according to the distance between the current position of the magnetic head 26 and the seek target position. First the MCU 7 samples the read output of the magnetic head 26 via the read channel 9 and detects servo information.

(S12) The MCU 7 demodulates the read output servo information to obtain the current position. As stated above, a track number indicated by a gray code and an offset burst pattern A, B, C, D are recorded, as servo information, on each track.

(S14) The MCU 7 judges whether demodulation has succeeded. For example, there are cases in which servo information cannot be detected from the read output, and the demodulated position cannot be obtained. Moreover, in coarse velocity control, when the error between the current position at the current sample as predicted from the previous sample and the current position detected from the current sample is large, demodulation is judged to have failed.

(S16) Upon judging that demodulation has failed, the MCU 7 judges whether demodulation failures have been continuous. For example, a judgment is made as to whether demodulation failures have continued for a number n of samples (for example, n=3). If demodulation failures have continued for a prescribed number of times, control is executed to halt operation due to a seek error. If on the other hand demodulation failures have not continued for the prescribed number of times, processing returns to step S10.

(S18) When demodulation is successful, the MCU 7 judges whether the demodulated current position is the target position. If the demodulated current position is not the target position, coarse control or fine control is executed, according to the position error. For example, if the position error between the target position and the current position is large, control is executed according to the velocity error between the target velocity and the current velocity based on the position error, according to the above-described coarse control velocity curve. This current velocity is obtained by dividing the difference between the current position at the time of the previous sample and the current position at the time of the current sample by the sample interval. If the position error is within a prescribed range (for example, 0.5 tracks), a transition is made to fine control (position control). Processing then returns to step S10. On the other hand, if the demodulated current position is the target position, seeking ends, and fine control (following control) is continued.

Next, seek error retry processing is explained using FIG. 6, referring to FIG. 7 and FIG. 8. In this processing, at the time of occurrence of a seek error, a check is performed to determine whether the magnetic head 26 has climbed onto the ramp 20, and the retry method is changed according to whether the head has or has not climbed onto the ramp 20.

(S20) When, in step S16 of FIG. 5, a seek error is detected, seek error retry processing is begun.

(S22) The MCU 7 judges whether the magnetic head 26 has climbed onto the ramp 20, as in FIG. 8. As the method of checking for climbing onto the ramp, MCU 7 monitors the raw waveform of the magnetic head 26 output from the head IC (preamp) 19, and if the waveform vanishes (the AC component is substantially "0"), MCU 7 judges that the head 26 has climbed onto the ramp 20. For example, if the waveform vanishes, when the AGC circuit 90 of the read channel 9 attempts to amplify the waveform, the gain continuously becomes at maximum gain. The firmware of the MCU 7 then monitors whether sticking (the continue of the maximum gain) of the gain of the AGC circuit 90 occurs. As shown in FIG. 7, when as a result of this check MCU 7 judges that the head 26 not have climbed onto the ramp 20, processing advances to step S26.

(S24) If on the other hand the magnetic head 26 is judged to have climbed onto the ramp 20, the MCU 7 executes the above unload control. That is, the MCU 7 drives the VCM 18 to move the arm 16 rightward in FIG. 8. By this means the lift 28 of the arm 16 climbs onto the inclined surface 20-1 of the ramp 20 and over the first level surface 20-2 to reach the groove portion 20-3, and stops at the step portion with the second level surface 20-4. As a result, the lift 28 falls precisely into the groove portion 20-3 and is parked. Next, the MCU 7 performs the above-described load operation. That is, the MCU 7 drives the VCM 18 to move the arm 16, which is parked in the groove portion 20-3, leftward in FIG. 8. By this means the lift 28 climbs over the inclined surface of the groove portion 20-3 and the first level surface 20-2, and slides down the inclined surface 20-1, so that the arm 16 comprising the head 26 is returned to above the magnetic disk 12. As is well known, at the time of this load operation the velocity is detected from the back-electromotive force of the VCM (actuator) 18 driving the arm 16 comprising the magnetic head, and the VCM 18 is velocity-controlled to load the magnetic head onto the magnetic disk 12 at a prescribed velocity, to prevent crashing.

(S26) The MCU 7 drives the VCM 18 to move the magnetic head 26 in seek movement inward over the magnetic disk 12, and tracks to the prescribed track. The MCU 7 takes the tracking position as the current position, and causes the magnetic head 26 to seek to the target track through the seek processing of the above-described FIG. 5.

(S28) The MCU 7 judges whether seeking has ended normally. The MCU 7 judges, for example, whether the above-described seek error has occurred. If seeking has ended normally, seek error retry ends. On the other hand, if seeking does not end normally, a judgment is made as to whether the number of retries is within a stipulated number.

If the number of retries is within the stipulated number, processing ends with an error, and processing returns to step S22. If the number of retries exceeds the stipulated number, processing ends anomalously.

In this way, immediately before beginning inner servo operation (seeking to an inner track) when seek error retry, a check is performed to determine whether the head 26 has climbed onto the ramp 20. If the head 26 has not climbed onto the ramp 20, normal inward servo operation is executed; if the head 26 has climbed onto the ramp 20, unloading is performed before restarting (unload→load→inward servo seek).

Consequently in a ramp-load device, crashes due to the head climbing onto the ramp as a result of seek errors can be avoided, and improved device reliability can be expected. Further, unload and load operations are not performed each time a seek error occurs, so that the retry time can be shortened, and wear of the ramp 20 and similar can be prevented.

Moreover, because the normal unload/load functions of a ramp-load device are utilized, this embodiment can be realized without adding special functions. Further, the gain of the AGC circuit is monitored for sticking to judge whether the head has climbed onto the ramp 20, so that judgment can be performed simply by the firmware without providing a special mechanism.

OTHER EMBODIMENTS

In the above-described embodiment, the AGC gain is used to judge whether the head has climbed onto the ramp; but judgment may also be made based on the raw waveform of the magnetic head, or another mechanism to detect climbing onto the ramp may be provided.

Further, in addition to a magnetic disk device, application to an optical disk device, magneto-optical disk device, or similar is also possible. Also, application to ramp mechanisms with other shapes and arbitrary configurations is possible.

In the above, this invention has been explained through an embodiment, but various modifications can be made within the scope of the invention, and these modifications are not excluded from the scope of the invention.

At the time of seek error retry, prior to beginning seek retry a check is performed to determine whether the head has climbed onto the ramp, and if the head has not climbed onto the ramp normal seek retry is performed, but if the head has climbed onto the ramp an unload operation is first performed before the seek retry. Consequently crashes due to the head climbing onto the ramp as a result of a seek error in a ramp-load device can be prevented, and improvement of the device reliability can be expected, contributing to higher device recording densities and faster operation.

What is claimed is:

1. A seek error retry method for a disk device for performing a retry after a seek error occurring when seeking a head which at least reads information from a disk to a prescribed track position on said disk, comprising the steps of:
   judging whether said head has climbed onto a ramp provided to park said head, in response to said seek error detection;
   seeking again said head to said prescribed track when said judgment indicates that said head has not climbed onto said ramp;
   unloading said head onto said ramp and then loading said head from said ramp onto said disk when said judgment indicates that said head has climbed onto said ramp; and
   seeking again said head to said prescribed track after said loading.

2. The seek error retry method for a disk device according to claim 1, wherein said judgment step comprises a step of judging, from the head output, whether said head has climbed onto said ramp.

3. The seek error retry method for a disk device according to claim 2, wherein said judgment step comprises a step of judging, from a gain of an AGC circuit executing AGC control of the output of said head, whether said head has climbed onto said ramp.

4. The seek error retry method for a disk device according to claim 1, wherein said seek again step further comprises:
   a step of detecting whether said seek error has occurred; and
   a step of again executing said judgment step when said seek error is detected.

5. The seek error retry method for a disk device according to claim 4, further comprising a step of limiting the number of executions of said execution again step.

6. The seek error retry method for a disk device according to claim 1, wherein said load step comprise a step of executing velocity control of the movement of said head to perform loading onto said disk.

7. The seek error retry method for a disk device according to claim 1, wherein said judgment step comprises a step of judging whether said head has climbed onto said ramp, according to said seek error detected by the absence, in the output of said head, of servo information written to said disk.

8. The seek error retry method for a disk device according to claim 1, wherein said judgment step comprises a step of judging whether said head has climbed onto said ramp, based on the output of a magnetic head which is said head, which reads servo information written to a magnetic disk which is said disk.

9. The seek error retry method for a disk device according to claim 1, wherein said load step comprises a step of executing unload processing, to retract said head to said ramp, and load processing.

10. A disk device comprising:
    a head which at least reads information from a disk;
    an actuator which seeks said head to a prescribed track position of said disk;
    a control unit which controls said actuator based on output from said head, detects seek errors, and performs retry processing; and
    a ramp, provided to retract said head from said disk,
    wherein said control unit judges whether said head has climbed onto said ramp in response to detection of said seek errors, and when said judgment indicates that said head has not climbed onto said ramp, repeats seeking by said head of said prescribed track, but when said judgment indicates that said head has climbed onto said ramp, after unloading said head onto said ramp, loads said head from said ramp onto said disk, and again performs seeking of said prescribed track.

11. The disk device according to claim 10, wherein said control unit judges, from the output of the head, whether said head has climbed onto said ramp.

12. The disk device according to claim 11, wherein said control unit has an AGC circuit which performs AGC control of the output of said head, and judges, from a gain of said AGC circuit, whether said head has climbed onto said ramp.

13. The disk device according to claim 10, wherein said control unit detects whether a seek error has occurred when seeking again, and when said seek error is detected, repeats execution of judgment to determine whether said head has climbed said ramp.

14. The disk device according to claim 13, wherein said control unit limits the number of repeated executions of said ramp-climbing judgment.

15. The disk device according to claim 10, wherein said control unit performs velocity control of the movement of said head to load the head onto said disk.

16. The disk device according to claim 10, wherein said control unit judges whether said head has climbed onto said ramp in response to said seek error due to detection of the absence, in the output of said head, of servo information written to said disk.

17. The disk device according to claim 10, wherein said disk is a magnetic disk on which is written servo information, and said head is a magnetic head which reads servo information written to said magnetic disk.

18. The disk device according to claim 10, wherein said control unit, upon detection that said head has climbed onto said ramp, executes unload processing, to retract said head to said ramp, and load processing.

19. The disk device according to claim 10, wherein said ramp is provided near the outermost perimeter of said disk.

20. The disk device according to claim 10, wherein said control unit, when said head is not in operation, loads said head onto said ramp, and when said head is in operation, executes processing to load said head from said ramp onto said disk.

* * * * *